UNITED STATES PATENT OFFICE.

DAVID P. DOAK, OF ST. LOUIS, MISSOURI, ASSIGNOR TO THE MISSOURI SMELTING COMPANY, OF SAME PLACE.

MINERAL WOOL.

SPECIFICATION forming part of Letters Patent No. 605,042, dated May 31, 1898.

Application filed May 20, 1897. Serial No. 637,459. (Specimens.)

*To all whom it may concern:*

Be it known that I, DAVID P. DOAK, a citizen of the United States, residing at the city of St. Louis, in the State of Missouri, have invented a certain new and useful Improvement in Mineral Wool, of which the following is a full, clear, and exact description.

My invention relates to the manufacture of mineral wool produced from the slag resulting from the smelting of lead ore or other metallic ores into which lead is introduced as a flux in the process of smelting, the invention consisting in the employment of "lead slag," so termed, in combination with a suitable flux in the production of mineral wool. The slag employed in this process is composed substantially as follows: silica, thirty per cent.; iron, forty per cent.; lime, twenty per cent.; aluminium and lead, ten per cent. As will be readily observed, the percentage of lead in the composition is exceedingly small and the effect of its presence in the slag of little importance. The reason there is so large a percentage of iron in the slag employed by me ("lead slag," so termed) is that iron is introduced into the smelting-furnace as a flux, the main object of its introduction being for the purpose of providing an absorbent that will take up the sulfur found in lead-bearing ores. The iron being of a more refractory nature than the lead, it is not reduced to such an extent as to be drawn off from the furnace, but enters into the slag, which accounts for the high percentage of its elements in "lead slag," so termed.

In producing the mineral wool or fiber I carry out the process as contained in the following statement: I take fifty per cent. of "lead slag," so termed, and mix therewith a flux consisting of fifteen per cent. of silica and thirty-five per cent of carbonate of lime and inserting the whole mixture in a suitable furnace I apply sufficient heat to melt them. When the entire mass has been thoroughly melted and commingled, the molten mass is extracted from the furnace by running it in a stream therefrom. As the substance flows from the furnace a jet of steam or air is directed upon it, thereby breaking it into filaments or fiber.

I do not confine myself, broadly speaking, to the use of silica and carbonate of lime as a flux used in connection with the slag, as other materials may be employed with good results; nor do I confine myself to the proportions given, as other proportions might be employed, but those given have been found by me to give the best results.

By "lead slag" I mean slag resulting from the smelting of lead ores or slag resulting from the smelting of any ores in the process of smelting which lead is introduced as a flux—for example, such ores as those bearing gold, silver, and copper.

I am aware that heretofore mineral wool has been produced from blast-furnace slag derived from the smelting of iron-bearing ores; but so far as I am aware it has never heretofore been proposed to utilize slag resulting from the smelting of lead-bearing ores, which is the substance employed by me in the manufacture of my product.

In smelting iron-bearing ores it is clearly obvious that it is always the object that all the iron be removed from the ore to the greatest possible extent, and for this reason the resultant slag contains a barely-discernible trace of iron, if any, whereas in the smelting of lead-bearing ores iron is introduced to act as a flux to absorb the sulfur present in lead-bearing ores, and when the lead is extracted the iron remains in the slag by reason of its being more refractory than the lead and no effort being made to extract it. It is the large percentage of iron present in the slag employed by me that enables the production of a mineral wool having peculiar characteristics not found in mineral wool produced from slag taken from an iron blast-furnace.

The wool produced from slag from an iron blast-furnace is composed of short brittle fibers and contains little elasticity, whereas the iron present in the slag I employ causes the wool to contain long and ductile fibers of pronounced elasticity and renders the material of vastly-increased utility over that heretofore produced.

The mineral wool produced by me contains in chemical combination from thirty to forty per cent. of silica, from fifteen to twenty-five per cent. of iron, from thirty to forty per cent. of lime, and from ten to fifteen per cent. of aluminium and lead taken altogether.

I claim as my invention—

1. A mineral wool containing in chemical combination, silica, iron, lime, aluminium and lead.

2. A mineral wool containing in chemical combination, silica from thirty to forty per cent., iron from fifteen to twenty-five per cent., lime from thirty to forty per cent., and aluminium and lead from ten to fifteen per cent.

DAVID P. DOAK.

In presence of—
E. S. KNIGHT,
STANLEY STONER.